R. G. RAFFERTY
LIFTING CLAMP.
APPLICATION FILED APR. 3, 1914.
1,121,130.
Patented Dec. 15, 1914.
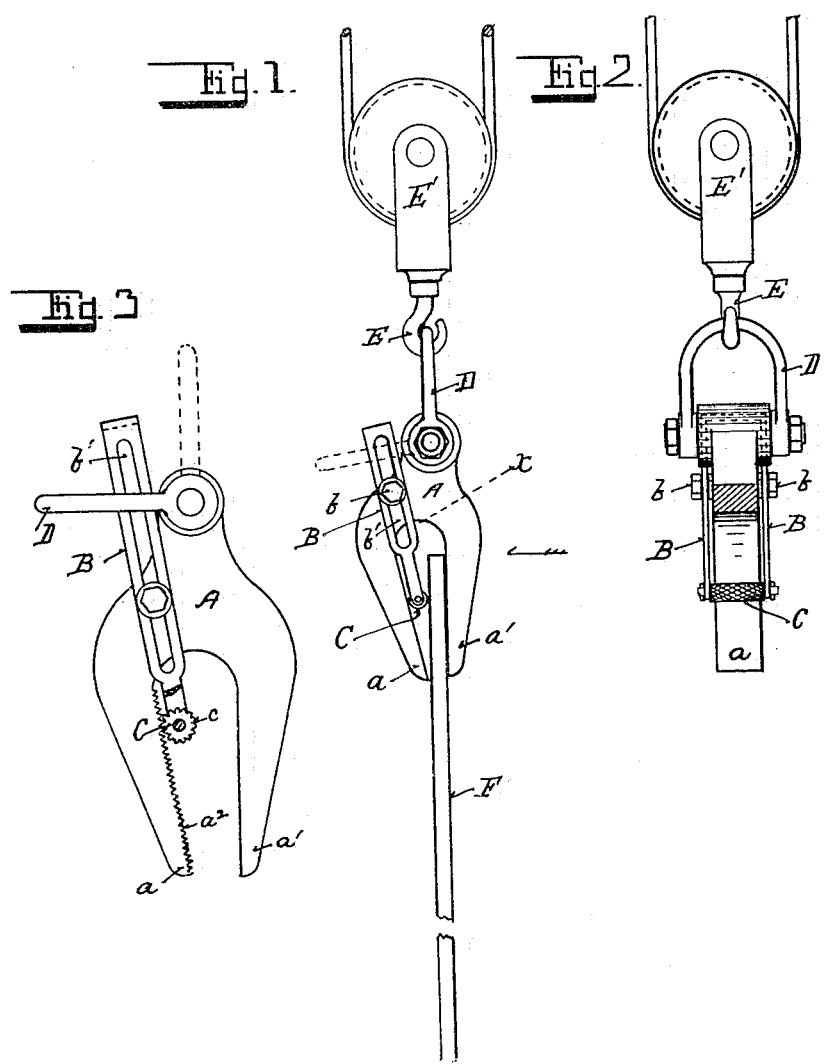
Witnesses.
E. E. Myers
A. Crovitt
Inventor.
Robert G. Rafferty
By J. C. H. M. Sturgeon
attys

UNITED STATES PATENT OFFICE.

ROBERT G. RAFFERTY, OF ERIE, PENNSYLVANIA.

LIFTING-CLAMP.

1,121,130.  Specification of Letters Patent.  Patented Dec. 15, 1914.

Application filed April 3, 1914. Serial No. 829,336.

*To all whom it may concern:*

Be it known that I, ROBERT G. RAFFERTY, a citizen of Great Britain, residing at Erie, in the county of Erie and State of Pennsylvania, have invented certain new and useful Improvements in Lifting-Clamps; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to gripping devices designed to grip a piece of sheet metal for the purpose of lifting and moving the same in shops.

The features of my invention are hereinafter described and pointed out and are illustrated in the accompanying drawings, in which:—

Figure 1, is a view in side elevation of my improved gripping device as employed in lifting metal sheets. Fig. 2, is a sectional side view of the same on the line $x$ in Fig. 1, looking in the direction of the arrow. Fig. 3, is an enlarged side elevation of the same showing a modified construction thereof.

In these drawings A, indicates the body of my improved gripping device, which is provided with arms $a$, and $a'$. The inner face of the arm $a$, is arranged at an inclination to the inner face of arm $a'$. Upon the body A, of this device, I slidably secure a bifurcated member B, by means of tap-bolts $b$, passing through slots $b'$, in said member and into the body A. Pivoted in the ends of the arms of the bifurcated member B, there is a roller C, of hardened metal, and having the cylindrical surface thereof provided with sharp points by nurling or otherwise as may be desired, which will prevent the surface of said roller C, from slipping on the inner surface of the arm $a$, and also prevent the same from slipping on the surface of a metal plate during the operation of lifting the same. In the upper end of the body A, I pivot a link or clevis D, which is preferably made of sufficient dimension to span the member B, when said link is in the position shown in full lines in Fig. 3, and broken lines in Fig. 2, so that said slidable member B, may be operated when the gripping device is in a horizontal position incident to taking hold of a piece of boiler plate while upon a floor. The link D, is adapted to be placed upon a hook E, of a hoisting pulley E', of a crane ordinarily used in metal working shops.

In Fig. 3, I show the inner face of the arm $a$, provided with sharp teeth $a^2$, and the roller C, is provided with sharp teeth $c$, which, in operation intermesh with the teeth $a^2$, so that the roller C, cannot slip on the inner surface of the arm $a$. In either form the object of the roughened surface of the roller C, is to prevent the same from slipping.

In operation the body A, is placed upon the edge of a piece of sheet metal F, and the member B, is operated to force the roller securely into contact with the inner surface of the arm $a$, and the sheet metal F, so as to force the arm $a'$, snugly up against the sheet metal with the inner surface of the arm $a'$, parallel with the side of said sheet metal. During this operation the sharp points on the hardened roller C, bite into the surfaces of the arm $a$, and sheet metal F, so that when the weight of the sheet metal F, is suspended upon the device, the roller C, is tightly wedged between the metal F, and the inner face of the arm $a$, thereby securely clamping the piece of sheet metal F, to the body A. When it is desired to release the device from a piece of sheet metal it may be driven forward toward the sheet metal which will loosen the roller C, and then by drawing the member B, backward, the roller C, can be withdrawn out of contact with the piece of sheet metal.

Having thus fully shown and described my invention, so as to enable others to construct and utilize the same, what I claim as new and desire to secure by Letters-Patent, is:—

1. In a lifting device, a body having a wedge-shaped slot therethrough, a bifurcated member having a slot in one of its arms embracing the upper portion of said body, a bolt passing through said slot and into said body to retain said bifurcated member in place, and a roller pivoted between the ends of said bifurcated member and within said wedge-shaped recess, substantially as set forth.

2. In a lifting device, a body having a wedge-shaped slot therethrough, an inverted U-shaped member embracing the intermediate portion of said body with the arms thereof longitudinally parallel with the sides of said body, and having a slot in one of the arms thereof, a bolt passing through said slot and secured in said body and adapted to permit said U-shaped member to slide longitudinally on said body, and a roller pivoted between the arms of said U-shaped member, substantially as set forth.

In testimony whereof I affix my signature, in presence of two witnesses.

ROBERT G. RAFFERTY.

Witnesses:
H. M. STURGEON,
P. V. GIFFORD.

Copies of this patent may be obtained for five cents each, by addressing the "Commissioner of Patents, Washington, D. C."